(12) United States Patent
Nakanishi et al.

(10) Patent No.: US 7,425,283 B2
(45) Date of Patent: *Sep. 16, 2008

(54) CYCLIC CARBONATE-MODIFIED SILOXANE, METHOD OF MAKING, NON-AQUEOUS ELECTROLYTIC SOLUTION, SECONDARY BATTERY, AND CAPACITOR

(75) Inventors: Tetsuo Nakanishi, Annaka (JP); Meguru Kashida, Annaka (JP); Satoru Miyawaki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/519,849

(22) Filed: Sep. 13, 2006

(65) Prior Publication Data

US 2007/0059597 A1    Mar. 15, 2007

(30) Foreign Application Priority Data

Sep. 14, 2005   (JP)   ............... 2005-267112

(51) Int. Cl.
 *C08G 77/14*   (2006.01)
(52) U.S. Cl. .................. 252/519.31; 556/436; 556/440; 528/27; 528/10; 528/12; 549/214
(58) Field of Classification Search ............ 252/519.31; 528/10, 12, 27; 556/436, 440; 549/214
See application file for complete search history.

(56) References Cited

U.S. PATENT DOCUMENTS

| 5,606,077 | A | * | 2/1997 | Lersch et al. ............... 549/214 |
| 5,686,547 | A | * | 11/1997 | Nye .......................... 528/15 |
| 6,124,062 | A | | 9/2000 | Horie et al. |
| 2005/0106470 | A1 | * | 5/2005 | Yoon et al. ................. 429/324 |

FOREIGN PATENT DOCUMENTS

| JP | 11-214032 A | 8/1999 |
| JP | 2000-58123 A | 2/2000 |
| JP | 2001-110455 A | 4/2001 |
| JP | 2003-142157 A | 5/2003 |

* cited by examiner

*Primary Examiner*—Margaret G Moore
(74) *Attorney, Agent, or Firm*—Birch, Stewart, Kolasch & Birch, LLP

(57) ABSTRACT

A siloxane modified with a cyclic carbonate of the formula:

(2)

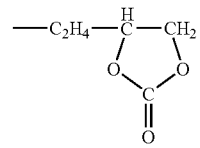

is combined with a non-aqueous solvent and an electrolyte salt to form a non-aqueous electrolytic solution, which is used to construct a secondary battery having improved temperature and cycle characteristics.

10 Claims, 1 Drawing Sheet

CYCLIC CARBONATE-MODIFIED SILOXANE, METHOD OF MAKING, NON-AQUEOUS ELECTROLYTIC SOLUTION, SECONDARY BATTERY, AND CAPACITOR

CROSS-REFERENCE TO RELATED APPLICATION

This non-provisional application claims priority under 35 U.S.C. §119(a) on Patent Application No. 2005-267112 filed in Japan on Sep. 14, 2005, the entire contents of which are hereby incorporated by reference.

TECHNICAL FIELD

This invention relates to a novel cyclic carbonate-modified siloxane, a method for preparing the same, and a non-aqueous electrolytic solution comprising the same. It also relates to energy devices using the electrolytic solution, specifically secondary batteries and electrochemical capacitors, and especially lithium ion secondary batteries.

BACKGROUND ART

Because of their high energy density, lithium ion secondary batteries are increasingly used in recent years as portable rechargeable power sources for laptop computers, mobile phones, digital cameras, digital video cameras, and the like. Also great efforts are devoted to the development of lithium ion secondary batteries and electric double-layer capacitors using non-aqueous electrolytic solution, as auxiliary power sources for electric and hybrid automobiles which are desired to reach a practically acceptable level as environment-friendly automobiles.

The lithium ion secondary batteries, albeit their high performance, are not satisfactory with respect to discharge characteristics in a rigorous environment, especially low-temperature environment, and discharge characteristics at high output levels requiring a large quantity of electricity within a short duration of time. On the other hand, the electric double-layer capacitors suffer from problems including insufficient withstand voltages and a decline with time of their electric capacity. Most batteries use non-aqueous electrolytic solutions based on low-flash-point solvents, typically dimethyl carbonate and diethyl carbonate. In case of thermal runaway in the battery, the electrolytic solution will vaporize and be decomposed, imposing the risk of battery rupture and ignition. Then, IC circuits are generally incorporated in the batteries as means for breaking currents under abnormal conditions, and safety valves are also incorporated for avoiding any rise of the battery internal pressure by the evolution of hydrocarbon gases. It is thus desired to further elaborate the electrolytic solutions for the purposes of safety improvement, weight reduction, and cost reduction.

Under the circumstances, polyether-modified siloxanes are of great interest because they are chemically stable and compatible with electrolytic solutions. Due to their ability to help dissolve electrolytes such as $LiPF_6$ thoroughly and their inherent surface activity, the polyether-modified siloxanes are effective in improving the wetting of electrodes or separators. It is also known that adding only a few percents of polyether-modified siloxane to electrolytic solutions improves the charge/discharge cycle performance. However, these effects are yet insufficient. Besides, the polyether-modified siloxanes lack thermal stability and additionally, have a relatively high melting point so that they encounter some problems during low-temperature service. It would be desirable to have additives which are more stable and more compatible with electrolytic solutions.

Reference should be made to JP-A 11-214032, JP-A 2000-58123 both corresponding to U.S. Pat. No. 6,124,062, JP-A 2001-110455, and JP-A 2003-142157.

DISCLOSURE OF THE INVENTION

An object of the present invention is to provide a non-aqueous electrolytic solution which enables construction of batteries (especially lithium ion secondary batteries) or electrochemical capacitors (such as electric double-layer capacitors) having improved discharge characteristics both at low temperatures and at high outputs as well as improved safety. Another object is to provide a cyclic carbonate-modified siloxane which is effective for use therein and a method for preparing the same. A further object is to provide secondary batteries using the electrolytic solution, specifically lithium ion secondary batteries and electrochemical capacitors.

The inventors have discovered a method for synthesizing a cyclic carbonate-modified siloxane by previously synthesizing a low molecular weight cyclic carbonate-modified silane having a hydrolyzable radical and subjecting it to hydrolysis, which method facilitates separation and purification and allows for design of different structures. It has been found that non-aqueous electrolytic solutions comprising the cyclic carbonate-modified siloxanes thus synthesized offer improved charge/discharge cycle performance and safety.

Specifically, the inventors made research if carbonate-modified silicones using ethylene carbonate having a vinyl radical as a functional radical could be a substitute for the polyether-modified silicones. Unfortunately, vinyl ethylene carbonate undergoes decarboxylation reaction during addition reaction with a SiH-bearing siloxane, forming alkoxysiloxane by-products, as shown by the reaction scheme below.

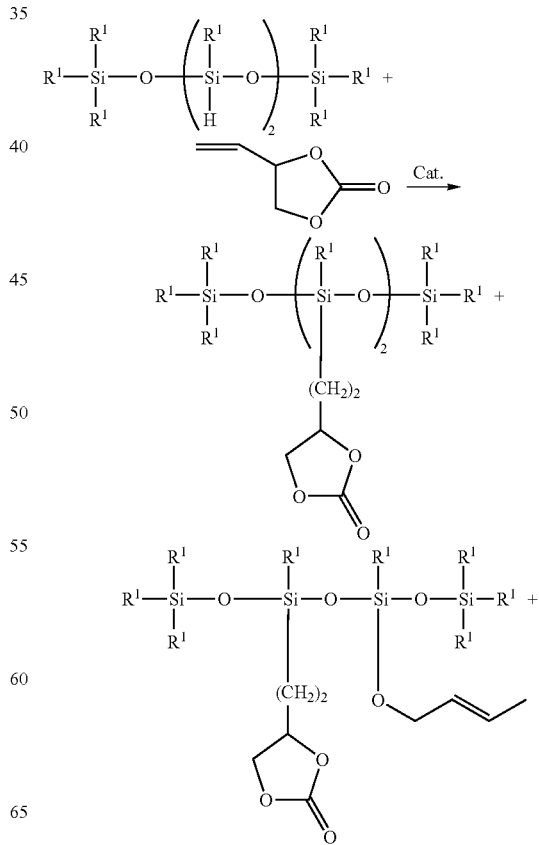

-continued

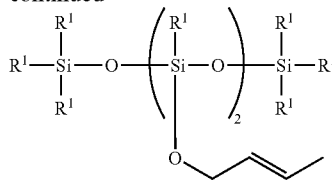

This necessitates steps of separating and purifying from the reaction product. It is thus difficult to synthesize modified or branched siloxanes with a high degree of polymerization, and the synthesis by way of addition reaction is limited to siloxanes with a low degree of polymerization. Needed are new methods for synthesizing siloxanes with a low degree of polymerization and modified siloxanes or branched modified siloxanes with a high degree of polymerization. The inventors have found that cyclic carbonate-modified siloxanes of formula (1) can be obtained through hydrolysis of cyclic carbonate-modified silanes of formula (5) to be described below; and that when the resulting cyclic carbonate-modified siloxanes are used in non-aqueous electrolytic solutions for batteries or capacitors, improved temperature and cycle characteristics are observed.

Accordingly, the present invention in one aspect provides a cyclic carbonate-modified siloxane having the following formula (1):

$$R^1_a A_b SiO_{(4-a-b)/2} \tag{1}$$

wherein $R^1$ is each independently a monovalent radical selected from the group consisting of hydroxyl radicals, and alkyl, aryl, aralkyl, amino-substituted alkyl, carboxyl-substituted alkyl, alkoxy, and aryloxy radicals of 1 to 30 carbon atoms which may be substituted with halogens, A is a cyclic carbonate radical of the formula (2):

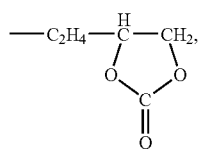

the subscript a is a positive number of 1.0 to 2.5, b is a positive number of 0.001 to 1.5, and the sum of a+b is from 1.001 to 3. Straight siloxanes containing less than or equal to three [$R^1ASiO_{2/2}$] units and cyclic siloxanes of 3 to 6 silicon atoms are excluded.

The preferred cyclic carbonate-modified siloxanes have the following formula (3):

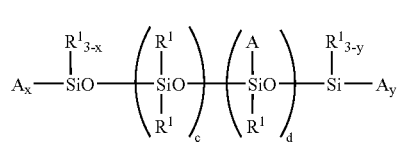

wherein $R^1$ and A are as defined above, c is an integer of 0 to 200, d is an integer of 4 to 200, x and y are independently 0 or 1.

Also preferred are cyclic carbonate-modified siloxanes having the following formula (4):

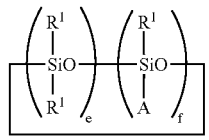

wherein $R^1$ and A are as defined above, e is an integer of 0 to 100, f is an integer of 1 to 100, and the sum of e+f is from 7 to 200.

In another aspect, the invention provides a method for preparing a cyclic carbonate-modified siloxane comprising the step of subjecting to hydrolytic condensation a cyclic carbonate-modified silane having the formula (5) alone or a hydrolyzable silane mixture comprising the same.

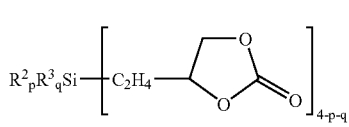

Herein $R^2$ is each independently a monovalent radical selected from the group consisting of alkyl, aryl, aralkyl, amino-substituted alkyl, and carboxyl-substituted alkyl radicals of 1 to 30 carbon atoms which may be substituted with halogens, $R^3$ is each independently a monovalent hydrolyzable radical selected from the group consisting of hydrogen atoms, hydroxyl radicals, alkoxy radicals, aryloxy radicals, and halogen atoms, p is an integer of 0 to 2, q is an integer of 1 to 3, and the sum of p+q is equal to or less than 3.

The cyclic carbonate-modified siloxane produced by the method is as defined in the first aspect.

In a preferred embodiment, $R^3$ in formula (5) is an alkoxy radical of 1 to 6 carbon atoms. Typically in formula (5), p is 0 and q is 3; p is 1 and q is 2; or p is 2 and q is 1.

In a further aspect, the present invention provides a non-aqueous electrolytic solution comprising a non-aqueous solvent, an electrolyte salt, and the cyclic carbonate-modified siloxane described above. In a still further aspect, the present invention provides a secondary battery, especially lithium ion secondary battery, and an electrochemical capacitor, comprising the non-aqueous electrolytic solution defined above. In the lithium ion secondary battery comprising a positive electrode, a negative electrode, a separator, and the non-aqueous electrolytic solution of the invention, charging/discharging operation occurs through migration of lithium ions between positive and negative electrodes.

BENEFITS OF THE INVENTION

Batteries using the non-aqueous electrolytic solution comprising a cyclic carbonate-modified siloxane according to the invention exhibit improved temperature and cycle characteristics.

BRIEF DESCRIPTION OF THE DRAWING

The only figure.

DESCRIPTION OF THE PREFERRED EMBODIMENTS

Figure 1:
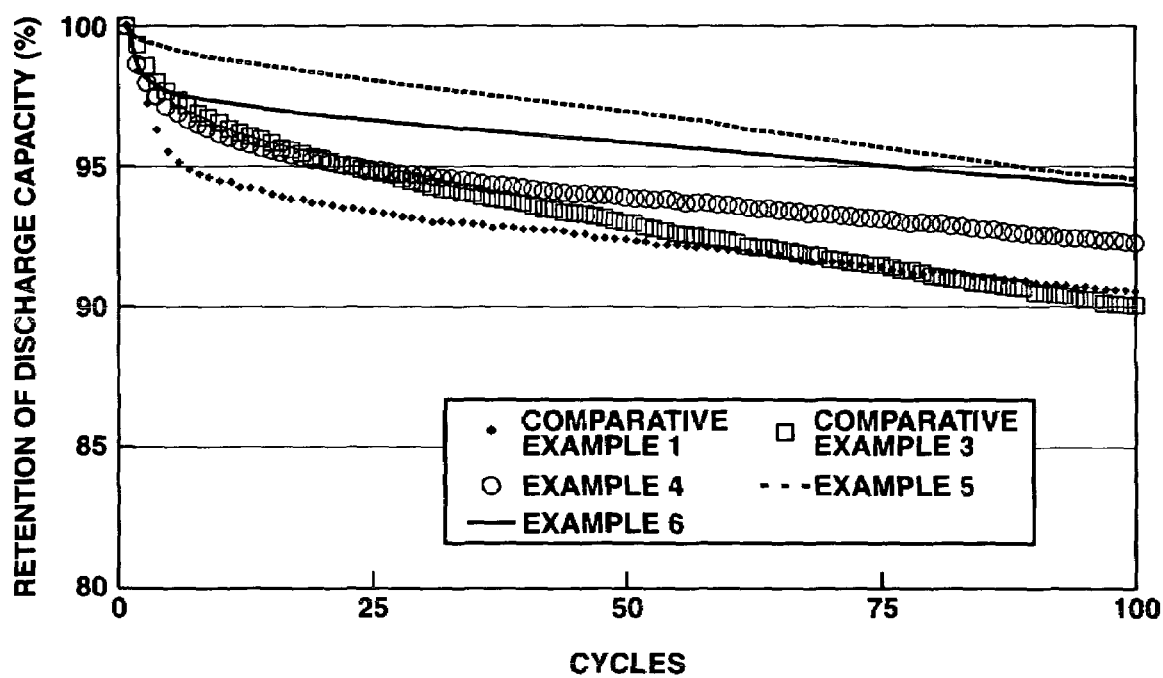
FIG. 1 is a graph of discharge capacity retention versus cycles of the non-aqueous electrolytic solutions in Examples 4-6 and Comparative Examples 1 and 3.

The cyclic carbonate-modified siloxanes used in non-aqueous electrolytic solutions according to the invention are hydrolytic condensates of cyclic carbonate-modified silanes having hydrolyzable radicals, represented by the formula (5), or co-hydrolytic condensates of the foregoing cyclic carbonate-modified silane and another hydrolyzable silane. The siloxane skeleton of the cyclic carbonate-modified siloxanes thus obtained may be any of straight, cyclic, branched and three-dimensional network molecular structures. It is noted that straight siloxanes containing less than or equal to three $[R^1ASiO_{2/2}]$ units per molecule and cyclic siloxanes having 3 to 6 silicon atoms per molecule are excluded.

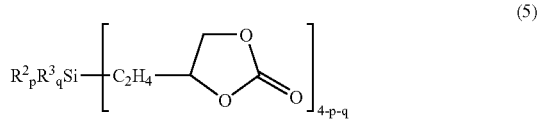
(5)

In formula (5), $R^2$ may be the same or different and is selected from among alkyl radicals, aryl radicals, aralkyl radicals, amino-substituted alkyl radicals, and carboxyl-substituted alkyl radicals of 1 to 30 carbon atoms which may be substituted with one or more halogens. Examples include alkyl radicals such as methyl, ethyl, propyl, butyl, pentyl, hexyl, heptyl, octyl, nonyl, decyl, cyclopentyl, and cyclohexyl; aryl radicals such as phenyl and tolyl; aralkyl radicals such as benzyl and phenethyl; amino-substituted alkyl radicals such as 3-aminopropyl and 3-[(2-aminoethyl)amino]propyl; and carboxy-substituted alkyl radicals such as 3-carboxypropyl. Also included are halogenated alkyl radicals in which some hydrogen atoms are substituted by halogen atoms, such as trifluoropropyl and nonafluorooctyl. Of these, alkyl and fluoroalkyl radicals of 1 to 6 carbon atoms are preferred. Methyl and ethyl are most preferred. It is especially preferred that at least 80 mol % of $R^2$ be methyl or ethyl.

In formula (5), $R^3$ may be the same or different and is a hydrolyzable radical selected from among hydrogen atoms, hydroxyl radicals, alkoxy radicals, aryloxy radicals, and halogen atoms. When hydroxyl or alkoxy radicals are selected as the hydrolyzable radical, hydrolytic reaction is advantageously performed under acidic conditions, examples of the preferred alkoxy radicals including methoxy, ethoxy and propoxy. When hydrogen atoms or hydroxyl radicals are selected, hydrolytic reaction is advantageously performed under alkaline conditions. When halogen atoms are selected, hydrolytic reaction may be performed by pouring into a large volume of water, examples of the preferred halogens including fluorine, chlorine and bromine. Preferred for the control of reaction and ease of post-treatment is hydrolysis of alkoxy-containing silanes under acidic conditions.

The subscript p is an integer of 0 to 2, q is an integer of 1 to 3, and the sum of p+q is equal to or less than 3 (i.e., $p+q \leq 3$). For p=0, q is selected to be equal to 1, 2 or 3. Examples include the following structures wherein $R^2$ and $R^3$ are as defined above.

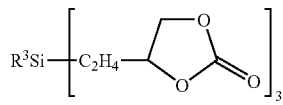

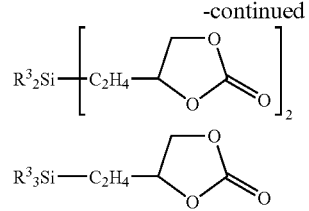

For p=1, q is selected to be equal to 1 or 2. Examples include the following structures.

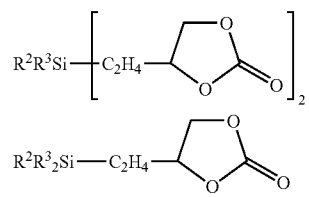

For p=2, q is equal to 1. This is exemplified by the following structure.

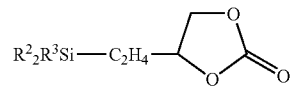

The cyclic carbonate-modified silanes can be obtained through addition reaction of an organohydrogensilane having a silicon-bonded hydrogen atom (i.e., SiH radical) with vinyl ethylene carbonate (i.e., 4-vinyl-1,3-dioxolan-2-one). Suitable organohydrogensilanes include trimethoxysilane $(H(MeO)_3Si)$, methyldimethoxysilane $(HMe(MeO)_2Si)$ and dimethylmethoxysilane $(HMe_2(MeO)Si)$. It is noted that vinyl ethylene carbonate can be synthesized by several methods, for example, reaction of 3-butene-1,2-diol with a dialkyl carbonate in the presence of potassium carbonate, reaction of 3-butene-1,2-diol with urea, and addition reaction of carbon dioxide to 2-vinyloxirane.

Desirably the addition reaction is effected in the presence of a platinum or rhodium catalyst. Suitable catalysts used herein include chloroplatinic acid, alcohol-modified chloroplatinic acid, and chloroplatinic acid-vinyl siloxane complexes. Further sodium acetate or sodium citrate may be added as a co-catalyst or pH buffer. The catalyst is used in a catalytic amount, and preferably such that platinum or rhodium is present in an amount of up to 50 ppm, more preferably up to 20 ppm, relative to the total weight of the SiH-bearing silane and the vinyl ethylene carbonate.

If desired, the addition reaction may be effected in an organic solvent. Suitable organic solvents include aliphatic alcohols such as methanol, ethanol, 2-propanol and butanol; aromatic hydrocarbons such as toluene and xylene; aliphatic or alicyclic hydrocarbons such as n-pentane, n-hexane, and cyclohexane; and halogenated hydrocarbons such as dichloromethane, chloroform and carbon tetrachloride. Addition reaction conditions are not particularly limited. Typically addition reaction is effected under reflux for about 1 to 10 hours.

The cyclic carbonate-modified siloxane of the invention can be obtained through (co)hydrolytic condensation of a cyclic carbonate-modified silane having a hydrolyzable radical alone, or a hydrolyzable silane mixture comprising the same. The reactive silanes having a hydrolyzable radical(s) are exemplified below. Examples of hydrolyzable silanes having hydrogen atoms include trimethylsilane, dimethylsilane and methylsilane. Examples of hydrolyzable silanes having hydroxyl radicals include trimethylsilanol, dimethyldisilanol, and methyltrisilanol. Examples of hydrolyzable silanes having alkoxy radicals include trimethylmethoxysilane, dimethyldimethoxysilane, methyltrimethoxysilane, and tetramethoxysilane, provided that the alkoxy radical is methoxy, for example. Examples of hydrolyzable silanes having halogen atoms include trimethylchlorosilane, dimethyldichlorosilane, methyltrichlorosilane, and tetrachlorosilane.

The hydrolytic reaction may be conducted by well-known techniques and under ordinary conditions. In general, the amount of water used per mole of the hydrolyzable radical-bearing cyclic carbonate-modified silane is preferably 0.3 to 3 moles, especially 0.4 to 2.4 moles, depending on the moles of hydrolyzable radicals per molecule of the cyclic carbonate-modified silane. In this case, an organic solvent such as an alcohol may be used as a compatibilizing agent in an amount of 0.2 to 100 moles per mole of said silane. Suitable hydrolytic catalysts are acidic catalysts including mineral acids such as sulfuric acid, methanesulfonic acid, hydrochloric acid, and phosphoric acid, and carboxylic acids such as formic acid, acetic acid, and trifluoroacetic acid; and alkaline catalysts including hydroxides of alkali and alkaline earth metals such as sodium hydroxide, potassium hydroxide, and magnesium hydroxide. The catalyst is used in a catalytic amount of about 0.1% to about 10% by weight of the overall reaction solution. The reaction temperature is in a range of −50° C. to 40° C., especially −20° C. to 20° C., and the reaction time is generally from about 1 hour to about 10 hours.

The hydrolytic reaction is carried out, for example, by previously synthesizing an addition reaction product of trimethoxysilane (H(MeO)$_3$Si), methyldimethoxysilane (HMe(MeO)$_2$Si) or dimethylmethoxysilane (HMe$_2$(MeO)Si) with vinyl ethylene carbonate (i.e., 4-vinyl-1,3-dioxolan-2-one). The reaction product is then combined with an alkoxysilane selected from among tetramethoxysilane, methyltrimethoxysilane, dimethyldimethoxysilane and trimethylmethoxysilane, and subjected to hydrolysis in the presence of sulfuric acid or methanesulfonic acid. This formulation is also true when the alkoxy radical is ethoxy. In the event the halogenated silane is used, a halogenated carbonate silane is synthesized through the above-described addition reaction and then added dropwise to a large volume of water together with a chlorosilane of proper choice. In any of these reaction routes, a solvent such as alcohol is conveniently used as a compatibilizing agent. Since the reaction is exothermic, the reaction system is preferably cooled at about 0° C.

The cyclic carbonate-modified siloxanes synthesized by the method of the invention are cyclic carbonate-modified siloxanes whose siloxane skeleton has a straight, cyclic, branched or three-dimensional network molecular structure, represented by the general compositional formula (1').

(1')

Herein R$^1$ may be the same or different and is a monovalent radical selected from among hydroxyl radicals, and alkyl, aryl, aralkyl, amino-substituted alkyl, carboxyl-substituted alkyl, alkoxy, and aryloxy radicals of 1 to 30 carbon atoms which may be substituted with one or more halogens, A is a cyclic carbonate radical of the formula (2):

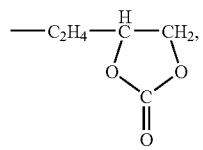
(2)

the subscript a is a positive number of 1.0 to 2.5, b is a positive number of 0.001 to 1.5, and the sum of a+b is from 1.001 to 3.

In the siloxanes of formula (1'), the number of silicon atoms per molecule is not limited, which means that those siloxanes of at least two silicon atoms (that is, those having at least one siloxane (Si—O—Si) structure in the molecule) are included, and the number of difunctional [R$^1$ASiO$_{2/2}$] units is not limited. It is noted that the difunctional units differ from monofunctional R$^1_2$ASiO$_{1/2}$ and R$^1$A$_2$SiO$_{1/2}$ units and trifunctional ASiO$_{3/2}$ units. Preferred are cyclic carbonate-modified siloxanes having the general formula (1):

(1)

wherein R$^1$, A, a and b are as defined above, while the number of silicon atoms or the number of R$^1$ASiO$_{2/2}$ units per molecular is limited as follows, that is, straight siloxanes excluding straight siloxanes containing less than or equal to three [RASiO$_{2/2}$] units per molecule and cyclic siloxanes excluding cyclic siloxanes of 3 to 6 silicon atoms. Inter alia, among straight chain structure siloxanes, those having at least 6 silicon atoms, especially at least 9 silicon atoms per molecule are preferred; among cyclic structure siloxanes, those having at least 7 silicon atoms per molecule are preferred; and among branched or three-dimensional network structure siloxanes, those having at least 4 silicon atoms per molecule are preferred. Among the straight or cyclic structure siloxanes, those having at least 4 cyclic carbonate-containing difunctional siloxane units represented by [R$^1$ASiO$_{2/2}$] per molecule are desirable, the number of these siloxane units being more desirably 4 to about 200, and most desirably 4 to about 100.

In formula (1) or (1'), R$^1$ may be the same or different and is selected from among hydroxyl radicals, and alkyl, aryl, aralkyl, amino-substituted alkyl, carboxyl-substituted alkyl, alkoxy, and aryloxy radicals of 1 to 30 carbon atoms which may be substituted with one or more halogens. Examples include hydroxyl radicals, alkyl radicals such as methyl, ethyl, propyl, butyl, pentyl, hexyl, heptyl, octyl, nonyl, decyl, cyclopentyl, and cyclohexyl; aryl radicals such as phenyl and tolyl; aralkyl radicals such as benzyl and phenethyl; amino-substituted alkyl radicals such as 3-aminopropyl and 3-[(2-aminoethyl)amino]propyl; and carboxy-substituted alkyl radicals such as 3-carboxypropyl. Also included are halogenated alkyl radicals in which some hydrogen atoms are substituted by halogen atoms, such as trifluoropropyl and nonafluorooctyl. Suitable alkoxy radicals include methoxy, ethoxy, propoxy, and isopropoxy. A typical aryloxy radical is phenoxy. Of these, alkyl and fluoroalkyl radicals of 1 to 6 carbon atoms are preferred. Methyl and ethyl are most preferred. It is especially preferred that at least 80 mol % of R$^1$ be methyl or ethyl.

A is a cyclic carbonate radical of the general formula (2).

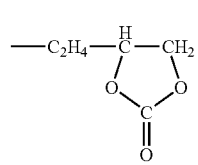
(2)

The subscript "a" is a positive number of 1.0≦a≦2.5, preferably 1.5≦a≦2.5. If a<1.0, the carbonate-modified siloxane may have a viscosity high enough to reduce the ion mobility in the electrolytic solution and no improvement in wetting be expected sometimes. If a>2.5, the siloxane may become less compatible with electrolytic solution and difficult to facilitate stable dissolution of the electrolyte. The subscript "b" is a positive number of 0.001≦b≦1.5, preferably 0.1≦b≦1.0. If b<0.001, the carbonate-modified siloxane may have a reduced carbonate content and may become less compatible with electrolytic solution and difficult to facilitate stable dissolution of the electrolyte. If b>1.5, the carbonate-modified siloxane may have a viscosity high enough to reduce the ion mobility in the electrolytic solution and no improvement in wetting be expected sometimes. The sum of a+b is in a range of $1.001 \leq a+b \leq 3$, preferably $1.1 \leq a+b \leq 2.5$, and more preferably $1.5 \leq a+b \leq 2.23$.

The cyclic carbonate-modified siloxanes of formula (1) may be straight siloxanes of the following formula (3).

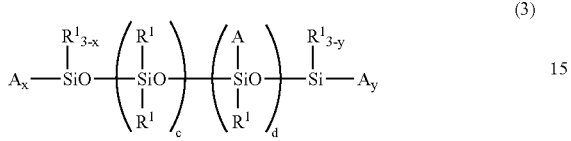

(3)

Herein $R^1$ and A are as defined above, c and d are integers preferably in the range: $0 \leq c \leq 200$ and $4 \leq d \leq 200$, more preferably in the range: $1 \leq c \leq 100$ and $4 \leq d \leq 100$, and even more preferably in the range: $4 \leq c \leq 50$ and $4 \leq d \leq 50$; x and y are independently 0 or 1.

The cyclic carbonate-modified siloxanes of formula (1) may also be cyclic siloxanes of the following formula (4).

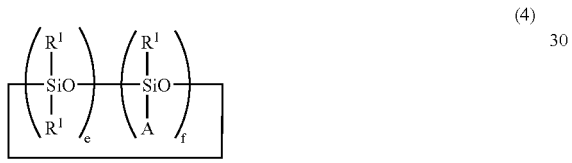

(4)

Herein $R^1$ and A are as defined above, e and f are integers preferably in the range: $0 \leq e \leq 100$, $1 \leq f \leq 100$, and $7 \leq e+f \leq 200$, more preferably in the range: $0 \leq e \leq 100$, $4 \leq f \leq 100$, and $7 \leq e+f \leq 200$, and even more preferably in the range: $0 \leq e \leq 50$, $10 \leq f \leq 50$, and $10 \leq e+f \leq 100$.

The cyclic carbonate-modified siloxanes synthesized by the method of the invention should preferably have a weight average molecular weight (Mw) of less than or equal to about 100,000, as measured by gel permeation chromatography (GPC) versus polystyrene standards. Larger molecular weights generally correspond to higher viscosities, leading to a drop of ion mobility in the electrolytic solution. Sometimes, no improvement in wetting may be expected. For these reasons, the Mw is preferably less than or equal to about 10,000. In an embodiment where the cyclic carbonate-modified siloxane is used alone as a non-aqueous solvent without using an ordinary non-aqueous solvent, it should preferably have a viscosity less than or equal to 100 mPa·s, which suggests a preferred molecular weight less than or equal to 1,000. The lower limit of molecular weight is preferably at least 200, especially at least 300.

Illustrative examples of the cyclic carbonate-modified siloxanes of the invention include compounds having formulae (i) through (xi) shown below. Since the preparation method of the invention is effective particularly for the siloxane chains containing at least two or three carbonate radicals, unlikely addition reaction due to steric hindrance, and high molecular weights, the inventive method offers better results when applied to the compounds having formulae (iv) to (xi), as compared with the synthesis method resorting to addition reaction.

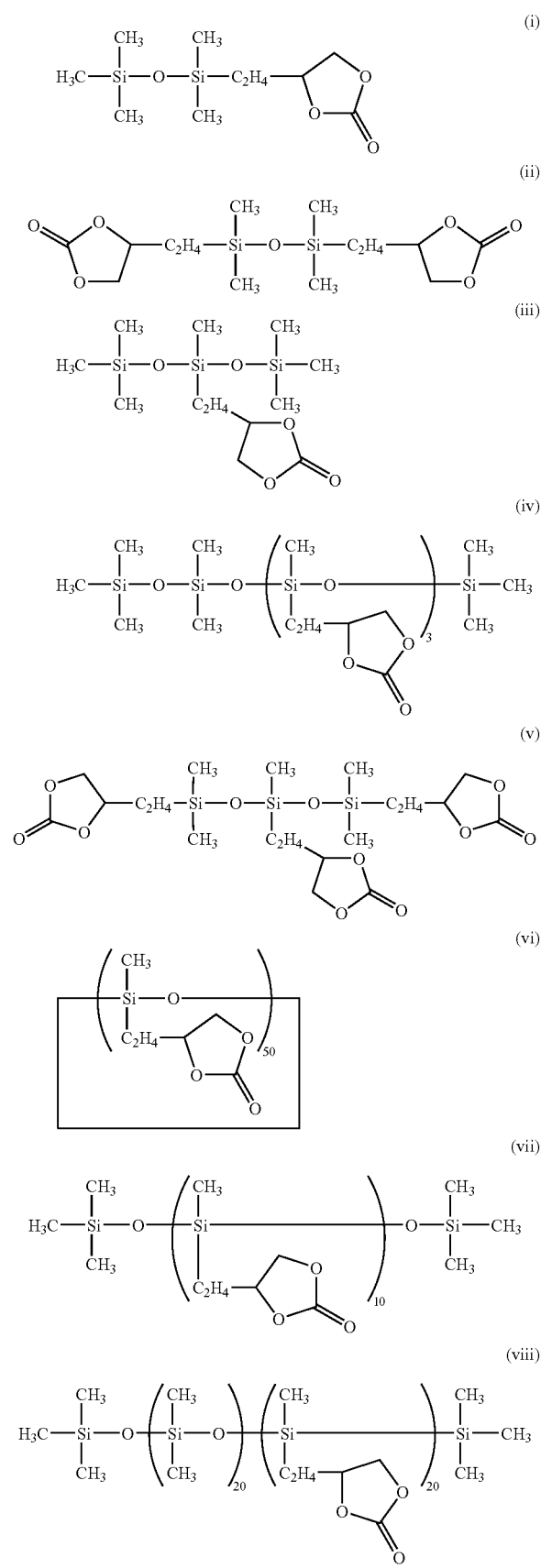

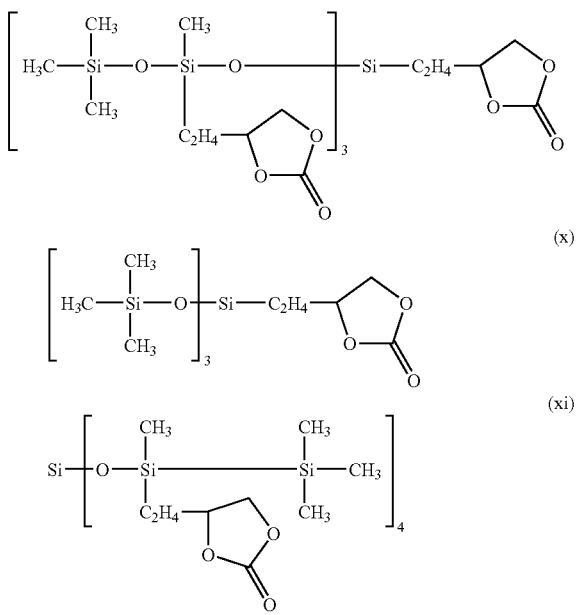

The present invention also provides a non-aqueous electrolytic solution comprising one or more cyclic carbonate-modified siloxanes as described above. In addition to the cyclic carbonate-modified siloxane, the non-aqueous electrolytic solution contains a non-aqueous solvent and an electrolyte salt.

In the non-aqueous electrolytic solution, the cyclic carbonate-modified siloxane should preferably be present in an amount of at least 0.001% by volume. If the content is less than 0.001% by volume, the desired effect may not be exerted. The preferred content is at least 0.1% by volume. The upper limit of the content varies with the type of a particular solvent used in the non-aqueous electrolytic solution, but should be determined such that migration of Li ions within the non-aqueous electrolytic solution is at or above the practically acceptable level. The content is usually up to 80% by volume, preferably up to 60% by volume, and more preferably up to 50% by volume of the non-aqueous electrolytic solution. Meanwhile, it is acceptable that the siloxane content in the non-aqueous electrolytic solution be 100% by volume, with any volatile solvent commonly used in non-aqueous electrolytic solutions of this type being omitted.

The non-aqueous electrolytic solution of the invention further contains an electrolyte salt and a non-aqueous solvent. Exemplary of the electrolyte salt used herein are light metal salts. Examples of the light metal salts include salts of alkali metals such as lithium, sodium and potassium, salts of alkaline earth metals such as magnesium and calcium, and aluminum salts. A choice may be made among these salts and mixtures thereof depending on a particular purpose. Examples of suitable lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$, and $C_4BO_8Li$, which may be used alone or in admixture.

From the electric conductivity aspect, the electrolyte salt is preferably present in a concentration of 0.5 to 2.0 mole/liter of the non-aqueous electrolytic solution. The electrolytic solution should preferably have a conductivity of at least 0.01 S/m at a temperature of 25° C., which may be adjusted in terms of the type and concentration of the electrolyte salt.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolane, sulfolane, methylsulfolane, acetonitrile, propionitrile, anisole, acetic acid esters, e.g., methyl acetate and propionic acid esters. It is desirable to use a mixture of an aprotic high-dielectric-constant solvent and an aprotic low-viscosity solvent in a proper ratio. It is also acceptable to use ionic liquids containing imidazolium, ammonium and pyridinium cations. The counter anions are not particularly limited and include $BF_4^-$, $PF_6^-$ and $(CF_3SO_2)_2N^-$. The ionic liquid may be used in admixture with the foregoing non-aqueous solvent.

Where a solid electrolyte or gel electrolyte is desired, a silicone gel, silicone polyether gel, acrylic gel, acrylonitrile gel, poly(vinylidene fluoride) or the like may be included in a polymer form. These ingredients may be polymerized prior to or after casting. They may be used alone or in admixture.

If desired, various additives may be added to the non-aqueous electrolytic solution of the invention. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid anhydrides, nitrogen- and sulfur-containing compounds for acid removal and water removal purposes.

A further embodiment of the present invention is a secondary battery comprising a positive electrode, a negative electrode, a separator, and an electrolytic solution, wherein the non-aqueous electrolytic solution described above is used as the electrolytic solution.

The positive electrode active materials include oxides and sulfides which are capable of occluding and releasing lithium ions. They may be used alone or in admixture. Examples include sulfides and oxides of metals excluding lithium such as $TiS_2$, $MoS_2$, $NbS_2$, $ZrS_2$, $VS_2$, $V_2O_5$, $MoO_3$, $Mg(V_3O_8)_2$, and lithium and lithium-containing complex oxides. Composite metals such as $NbSe_2$ are also useful. For increasing the energy density, lithium complex oxides based on $Li_pMetO_2$ are preferred wherein Met is preferably at least one element of cobalt, nickel, iron and manganese and p has a value in the range: $0.05 \leq p \leq 1.10$. Illustrative examples of the lithium complex oxides include $LiCoO_2$, $LiNiO_2$, $LiFeO_2$, and $Li_qNi_rCo_{1-r}O_2$ (wherein q and r have values varying with the charged/discharged state of the battery and usually in the range: $0<q<1$ and $0.7<r\leq 1$) having a layer structure, $LiMn_2O_4$ having a spinel structure, and rhombic $LiMnO_2$. Also used is a substitutional spinel type manganese compound adapted for high voltage operation which is $LiMet_sMn_{1-s}O_4$ wherein Met is titanium, chromium, iron, cobalt, nickel, copper, zinc or the like and s has a value in the range: $0<s<1$.

It is noted that the lithium complex oxide described above is prepared, for example, by grinding and mixing a carbonate, nitrate, oxide or hydroxide of lithium and a carbonate, nitrate, oxide or hydroxide of a transition metal in accordance with the desired composition, and firing at a temperature in the range of 600 to 1,000° C. in an oxygen atmosphere.

Organic materials may also be used as the positive electrode active material. Examples include polyacetylene, polypyrrole, poly-p-phenylene, polyaniline, polythiophene, polyacene, and polysulfide.

The negative electrode materials capable of occluding and releasing lithium ions include carbonaceous materials, metal elements and analogous metal elements, metal complex oxides, and polymers such as polyacetylene and polypyrrole.

Suitable carbonaceous materials are classified in terms of carbonization process, and include carbon species and synthetic graphite species synthesized by the gas phase process such as acetylene black, pyrolytic carbon and natural graphite; carbon species synthesized by the liquid phase process including cokes such as petroleum coke and pitch coke; pyrolytic carbons obtained by firing polymers, wooden materials, phenolic resins, and carbon films; and carbon species synthesized by the solid phase process such as charcoal, vitreous carbons, and carbon fibers.

Also included in the negative electrode materials capable of occluding and releasing lithium ions are metal elements and analogous metal elements capable of forming alloys with lithium, in the form of elements, alloys or compounds. Their state includes a solid solution, eutectic, and intermetallic compound, with two or more states being optionally co-present. They may be used alone or in admixture of two or more.

Examples of suitable metal elements and analogous metal elements include tin, lead, aluminum, indium, silicon, zinc, copper, cobalt, antimony, bismuth, cadmium, magnesium, boron, gallium, germanium, arsenic, selenium, tellurium, silver, hafnium, zirconium and yttrium. Inter alia, Group 4B metal elements or analogous metal elements in element, alloy or compound form are preferred. More preferred are silicon and tin or alloys or compounds thereof. They may be crystalline or amorphous.

Illustrative examples of such alloys and compounds include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, composite Si/SiC, $Si_3N_4$, $Si_2N_2O$, $SiO_v$ (wherein $0<v\leqq2$), composite SiO/C, $SnO_w$ (wherein $0<w\leqq2$), $SnSiO_3$, LiSiO and LiSnO.

Any desired method may be used in the preparation of positive and negative electrodes. Electrodes are generally prepared by adding an active material, binder, conductive agent and the like to a solvent to form a slurry, applying the slurry to a current collector sheet, drying and press bonding. The binder used herein is usually selected from polyvinylidene fluoride, polytetrafluoroethylene, styrene-butadiene rubber, isoprene rubber, and various polyimide resins. The conductive agent used herein is usually selected from carbonaceous materials such as graphite and carbon black, and metal materials such as copper and nickel. As the current collector, aluminum and aluminum alloys are usually employed for the positive electrode, and metals such as copper, stainless steel and nickel and alloys thereof employed for the negative electrode.

The separator disposed between the positive and negative electrodes is not particularly limited as long as it is stable to the electrolytic solution and holds the solution effectively. The separator is most often a porous sheet or non-woven fabric of polyolefins such as polyethylene and polypropylene. Porous glass and ceramics are employed as well.

The secondary battery may take any desired shape. In general, the battery is of the coin type wherein electrodes and a separator, all punched into coin shape, are stacked, or of the cylinder type wherein electrode sheets and a separator are spirally wound.

The non-aqueous electrolytic solution of the invention is also applicable to electrochemical capacitors comprising electrodes, a separator, and an electrolytic solution, especially electric double-layer capacitors or pseudo-electric double-layer capacitors, asymmetrical capacitors, and redox capacitors.

At least one of the electrodes in the capacitors is a polarizable electrode composed mainly of a carbonaceous material. The polarizable electrode is generally formed of a carbonaceous material, a conductive agent, and a binder. The polarizable electrode is prepared according to the same formulation as used for the lithium secondary battery. For example, it is prepared by mixing a powder or fibrous activated carbon with the conductive agent such as carbon black or acetylene black, adding polytetrafluoroethylene as the binder, and applying or pressing the mixture to a current collector of stainless steel or aluminum. Similarly, the separator and the electrolytic solution favor highly ion permeable materials, and the materials used in the lithium secondary battery can be used substantially in the same manner. The shape may be coin, cylindrical or rectangular.

EXAMPLE

Examples of the present invention are given below for further illustrating the invention, but they are not to be construed as limiting the invention thereto. The viscosity is measured at 25° C. by a rotational viscometer.

Preparation Example 1

Synthesis of Cyclic Carbonate-modified Silane Having Two Hydrolyzable Radicals

A reactor equipped with a stirrer, thermometer and reflux condenser was charged with 125 g of vinyl ethylene carbonate, 125 g of toluene, and 0.05 g of a 0.5 wt % chloroplatinic acid toluene solution. With stirring at 70° C., 114 g of methyldimethoxysilane was added dropwise to the mixture. Reaction took place while the molar ratio of terminal unsaturated radicals to SiH radicals was about 1.02. After the completion of dropwise addition, the reaction solution was aged at 80° C. for 2 hours to complete the reaction. The reaction solution was precision distilled in vacuum, collecting a fraction of 139° C./11 Pa. In this way, a carbonate-modified silane having the formula (6) shown below was obtained in a yield of 53%. It had a purity of 96.7% as analyzed by gas chromatography. On analysis by $^1$H-NMR using heavy chloroform as the measuring solvent, the peaks observed included 0.1 ppm (3H, s), 0.60 ppm (2H, m), 1.71 ppm (2H, m), 3.47 ppm (3H, s), 4.01 ppm (1H, dd), 4.45 ppm (1H, dd), and 4.63 ppm (1H, tt). From these data, the product was identified to be the target carbonate.

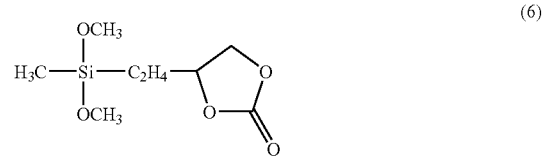

(6)

Synthesis of Cyclic Carbonate-modified Silane Having Three Hydrolyzable Radicals A reactor equipped with a stirrer, thermometer and reflux condenser was charged with 100 g of vinyl ethylene carbonate, 150 g of toluene, and 0.05 g of a 0.5 wt % chloroplatinic acid toluene solution. With stirring at 80° C., 128 g of trimethoxysilane was added dropwise to the mixture. Reaction took place while the molar ratio of terminal unsaturated radicals to SiH radicals was about 0.83. After the completion of dropwise addition, the reaction solution was aged at 80° C. for 2 hours to complete the reaction. The reaction solution was distilled in vacuum, collecting a fraction of 128° C./12 Pa. In this way, a cyclic carbonate-modified trimethoxysilane having the formula (7) shown below was obtained in a yield of 66 wt %. It had a purity of 95.0% as analyzed by gas chromatography. On analysis by $^1$H-NMR using heavy chloroform as the measuring solvent, the peaks observed included 0.51 ppm (2H, m), 1.65 ppm (2H, m), 3.40 ppm (9H, s), 3.93 ppm (1H, dd), 4.38 ppm (1H, dd), and 4.56 ppm (1H, tt). From these data, the product was identified to be the target carbonate.

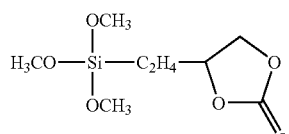

(7)

Preparation Example 2

A reactor equipped with a stirrer, thermometer and reflux condenser was charged with 110 g of the cyclic carbonate-modified methyldimethoxysilane having formula (6), 35 g of trimethylmethoxysilane, 20 g of dimethyldimethoxysilane, and 50 g of methanol and cooled to –10° C. To the reactor was added 3 g of conc. sulfuric acid. While cooling at –10° C., 18 g of deionized water was slowly added to the mixture for hydrolysis. The mixture was stirred for 2 hours, after which it was allowed to resume room temperature, combined with toluene, and washed with water. The toluene layer was separated, dried over anhydrous sodium sulfate, and distilled in vacuum for 2 hours, collecting a fraction of 120° C./50 Pa. In this way, a target carbonate-modified siloxane was obtained. It had a viscosity of 575 mPa-s and a specific gravity of 1.130. On analysis by $^1$H-NMR using heavy acetone as the measuring solvent, the peaks observed included 0.1 ppm (10H, s), 0.63 ppm (2H, m), 1.81 ppm (2H, m), 4.16 ppm (1H, dd), 4.60 ppm (1H, dd), and 4.77 ppm (1H, m). On analysis by $^{29}$Si-NMR, the peaks observed included -22 ppm (3.0 Si), -13 ppm (0.7 Si), and 8.2 ppm (2.0 Si). From these data, the product was identified to be a compound having the following average molecular formula.

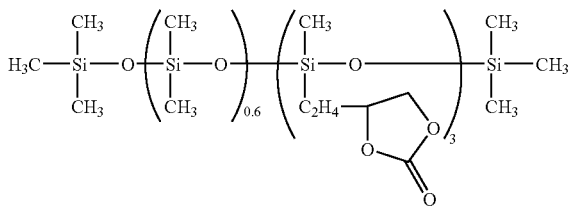

Example 1

A reactor equipped with a stirrer, thermometer and reflux condenser was charged with 110 g of the cyclic carbonate-modified methyldimethoxysilane having formula (6), 10.4 g of trimethylmethoxysilane, and 96 g of methanol and cooled to –10° C. To the reactor was added 2.5 g of conc. sulfuric acid. While cooling at –10° C., 12 g of deionized water was slowly added to the mixture for hydrolysis. The mixture was stirred for 2 hours, after which it was allowed to resume room temperature, combined with toluene, and washed with water. The toluene layer was separated, dried over anhydrous sodium sulfate, and distilled in vacuum for 2 hours, collecting a fraction of 120° C./50 Pa. In this way, a target carbonate-modified siloxane was obtained. It had a viscosity of 66,000 mPa-s. On analysis by $^1$H-NMR using heavy acetone as the measuring solvent, the peaks observed included 0.15 ppm (5.2H, s), 0.68 ppm (2H, m), 1.85 ppm (2H, m), 4.17 ppm (1H, m), 4.63 ppm (1H, m), and 4.79 ppm (1H, m). On analysis by $^{29}$Si-NMR, the peaks observed included -22 ppm (8.2 Si) and 8 ppm (2.0 Si). From these data, the product was identified to be a compound having the following average molecular formula (8).

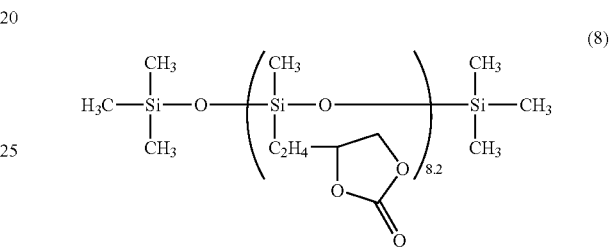

(8)

Example 2

A reactor equipped with a stirrer, thermometer and reflux condenser was charged with 78 g of the cyclic carbonate-modified trimethoxysilane having formula (7), 104 g of trimethylmethoxysilane, and 40 g of methanol and cooled to –10° C. To the reactor was added 3 g of conc. sulfuric acid. While cooling at –10° C., 22 g of deionized water was slowly added to the mixture for hydrolysis. The mixture was stirred for 2 hours, after which it was allowed to resume room temperature, combined with toluene, and washed with water. The toluene layer was separated, dried over anhydrous sodium sulfate, and distilled in vacuum, collecting a fraction of 121° C./5 Pa. In this way, a carbonate-modified siloxane was obtained. It had a purity of 93.5% as measured by gas chromatography, a viscosity of 25 mPa-s and a specific gravity of 0.992. On analysis by $^1$H-NMR using heavy acetone as the measuring solvent, the peaks observed included 0.12 ppm (27H, s), 0.55 ppm (2H, m), 1.81 ppm (2H, m), 3.47 ppm (0.3H, s, OCH$_3$), 4.16 ppm (1H, dd), 4.59 ppm (1H, dd), and 4.74 ppm (1H, tt). From these data, the product was identified to be a compound having the following molecular formula (9).

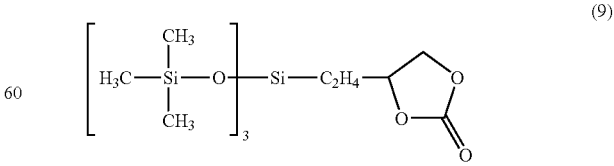

(9)

The reaction product was further analyzed for by-product, finding that it contained 6.5% of a compound having the following molecular formula (10).

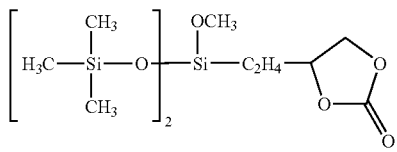

(10)

Example 3

A reactor equipped with a stirrer, thermometer and reflux condenser was charged with 110 g of the cyclic carbonate-modified methyldimethoxysilane having formula (6), 52 g of trimethylmethoxysilane, 19 g of tetramethoxysilane, and 50 g of methanol and cooled to −10° C. To the reactor was added 2.5 g of conc. sulfuric acid. While cooling at −10° C., 21.6 g of deionized water was slowly added to the mixture for hydrolysis. The mixture was stirred for 2 hours, after which it was allowed to resume room temperature, combined with toluene, and washed with water. The toluene layer was separated, dried over anhydrous sodium sulfate, and distilled in vacuum for 2 hours, collecting a fraction of 120° C./50 Pa. In this way, a carbonate-modified siloxane was obtained. It had a viscosity of 4,640 mPa-s and a specific gravity of 1.157. On analysis by $^1$H-NMR using heavy chloroform as the measuring solvent, the peaks observed included 0.1 ppm (39H, s), 0.5 ppm (8H, m), 1.7 ppm (8H, m), 3.4 ppm (0.8H, m), 4.1 ppm (4H, m), 4.4 ppm (4H, m), and 4.7 ppm (4H, m). On analysis by $^{29}$Si-NMR, the peaks observed included −106 ppm (0.97 Si), −22 ppm (4.0 Si) and 8.9 ppm (4.9 Si), with a signal of methoxy observed at 3.4 ppm. From these data, the product was presumed to be a compound having the following molecular formula (11) wherein X is hydrogen or methyl.

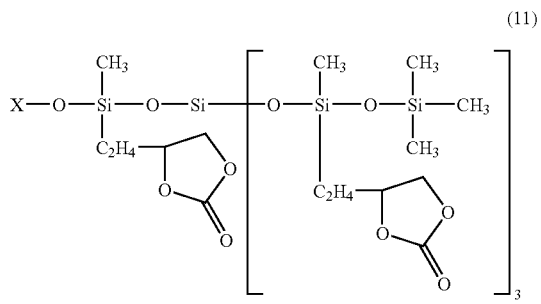

(11)

Examples 4-6 and Comparative Examples 1-3

Preparation of Non-aqueous Electrolytic Solution

Non-aqueous electrolytic solutions were prepared by dissolving the siloxanes of Examples 1 to 3 in a mixture of ethylene carbonate (EC) and diethyl carbonate (DEC) in the proportion shown in Table 1 and further dissolving LiPF$_6$ therein in a concentration of 1 mole/liter. For comparison purposes, a non-aqueous electrolytic solution free of the siloxane, a non-aqueous electrolytic solution having 5% by volume of a polyether-modified silicone added instead, and a non-aqueous electrolytic solution having added 5% by volume of the cyclic carbonate-modified siloxane of Preparation Example 2 outside the scope of the invention were prepared.

TABLE 1

| | EC (vol %) | DEC (vol %) | Modified siloxane | Viscosity (mPa-s) | Vol % |
|---|---|---|---|---|---|
| | | | Compound | | |
| Example 4 | 47.5 | 47.5 | Example 1 | 66,000 | 5 |
| Example 5 | 47.5 | 47.5 | Example 2 | 25 | 5 |
| Example 6 | 47.5 | 47.5 | Example 3 | 4,640 | 5 |
| | | | Additive | | |
| Comparative Example 1 | 50.0 | 50.0 | none | — | — |
| Comparative Example 2 | 47.5 | 47.5 | polyether-modified silicone* | 100 | 5 |
| Comparative Example 3 | 47.5 | 47.5 | modified siloxane of Preparation Example 2 | 575 | 5 |

*The polyether-modified silicone used in Comparative Example 3 is described in JP-A 11-214032 and has the following formula.

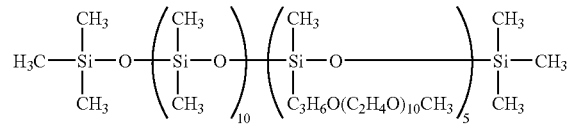

Preparation of Battery Materials

The positive electrode material used was a single layer sheet using LiCoO$_2$ as the active material and an aluminum foil as the current collector (trade name Pioxcel C-100 by Pionics Co., Ltd.). The negative electrode material used was a single layer sheet using graphite as the active material and a copper foil as the current collector (trade name Pioxcel A-100 by Pionics Co., Ltd.). The separator used was a porous polyolefin membrane (trade name Celgard® 2400 by Celgard, LLC).

Battery Assembly

A battery of 2032 coin type was assembled in a dry box blanketed with argon, using the foregoing battery materials, a stainless steel can housing also serving as a positive eletrode conductor, a stainless steel sealing plate also serving as a negative electrode conductor, and an insulating gasket.

Battery Test (Cycle Performance)

The steps of charging (up to 4.2 volts with a constant current flow of 0.6 mA) and discharging (down to 2.5 volts with a constant current flow of 0.6 mA) at 25° C. were repeated 100 cycles. A percentage retention of discharge capacity was calculated provided that the discharge capacity at the first cycle was 100. The results are shown in FIG. 1.

It is seen from FIG. 1 that as compared with Comparative Example 1, Examples 4, 5 and 6 having added cyclic carbonate-modified siloxanes within the scope of the invention offer reduced drops of discharge capacity. In particular, outstanding results were obtained with the cyclic carbonate-modified siloxane obtained in Example 1, which is a linear siloxane having a degree of polymerization of 8 (the average number of silicon atoms per molecule is about 10), and the cyclic carbonate-modified siloxanes obtained in Examples 2 and 3, which are branched siloxanes.

Battery Test (Low-temperature Characteristics)

The steps of charging (up to 4.2 volts with a constant current flow of 0.6 mA) and discharging (down to 2.5 volts with a constant current flow of 0.6 mA) at 25° C. were repeated 10 cycles, after which similar charging/discharging steps were repeated at 5° C. Provided that the discharge capacity at the 10th cycle at 25° C. is 100, the number of cycles repeated until the discharge capacity at 5° C. lowered to 80 was counted. The results are shown in Table 2.

TABLE 2

|  | Low-temperature test (cycles) |
| --- | --- |
| Example 4 | 193 |
| Example 5 | 233 |
| Example 6 | 199 |
| Comparative Example 1 | 85 |
| Comparative Example 2 | 14 |
| Comparative Example 3 | 173 |

As seen from Table 2, Examples of the invention wherein cyclic carbonate-modified siloxanes within the scope of the invention are added demonstrate excellent temperature and high-output characteristics as compared with Comparative Example 1 wherein no carbonate-modified siloxane is added, Comparative Example 2 wherein polyether-modified silicone is added, and Comparative Example 3 wherein a cyclic carbonate-modified siloxane having a molecular structure outside the scope of the invention is added.

Japanese Patent Application No. 2005-267112 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A cyclic carbonate-modified siloxane having the following formula (4):

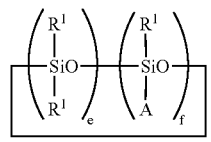

wherein
R$^1$ is each independently a monovalent radical selected from the group consisting of hydroxyl radicals, and alkyl, aryl, aralkyl, amino-substituted alkyl, carboxyl-substituted alkyl, alkoxy, and aryloxy radicals of 1 to 30 carbon atoms which may be substituted with halogens,
A is a cyclic carbonate radical of the formula (2):

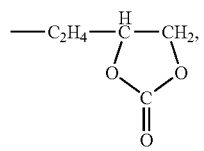

e is an integer of 0 to 100,
f is an integer of 1 to 100, and
the sum of e+f is from 7 to 200.

2. A method for preparing a cyclic carbonate-modified siloxane having the following formula (1):

wherein R$^1$ is each independently a monovalent radical selected from the group consisting of hydroxyl radicals, and alkyl, aryl, aralkyl, amino-substituted alkyl, carboxyl-substituted alkyl, alkoxy, and aryloxy radicals of 1 to 30 carbon atoms which may be substituted with halogens, A is a cyclic carbonate radical of the formula (2):

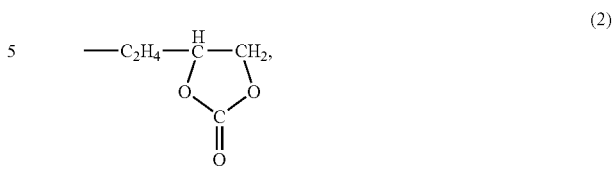

the subscript a is a positive number of 1.0 to 2.5, b is a positive number of 0.001 to 1.5, and the sum of a+b from 1.001 to 3, with the proviso that straight siloxanes containing less than or equal to three [R$^1$ASiO$_{2/2}$] units and cyclic siloxanes of 3 to 6 silicon atoms we excluded, comprising the step of subjecting to hydrolytic condensation a cyclic carbonate-modified silane having the formula (5') alone or a hydrolyzable silane mixture comprising the same:

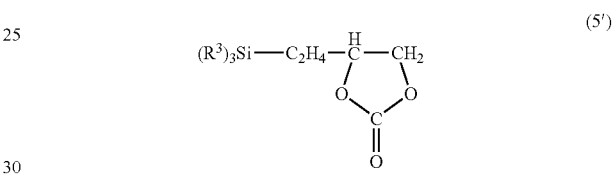

wherein R$^3$ is each independently a monovalent hydrolyzable radical selected from the group consisting of hydrogen atoms, hydroxyl radicals, alkoxy radicals, aryloxy radicals, and halogen atoms.

3. The method of claim 2 wherein R$^3$ in formula (5) is an alkoxy radical of 1 to 6 carbon atoms.

4. A non-aqueous electrolytic solution comprising a non-aqueous solvent, an electrolyte salt, and a cyclic carbonate-modified siloxane having the following formula (4)

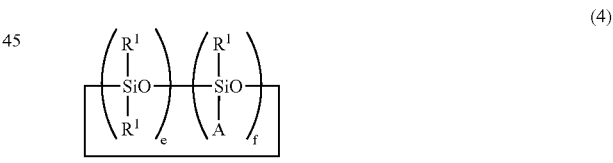

wherein R$^1$ is each independently a monovalent radical selected from the group consisting of hydroxyl radicals, and alkyl, aryl, aralkyl, amino-substituted alkyl, carboxyl-substituted alkyl, alkoxy, and aryloxy radicals of 1 to 30 carbon atoms which may be substituted with halogens, A is a cyclic carbonate radical of the formula (2):

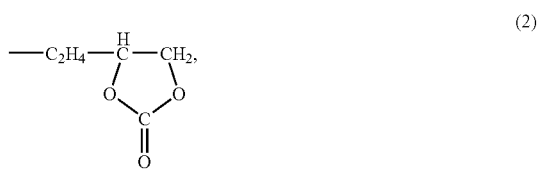

and the subscript e is an integer of 0 to 100, the subscript f is an integer of 1 to 100, and the sum of e+f is from 7 to 200.

5. The non-aqueous electrolytic solution of claim 4 wherein $R^1$ in formula (1) is an alkyl or fluoroalkyl radical of 1 to 6 carbon atoms.

6. The non-aqueous electrolytic solution of claim 4 wherein the cyclic carbonate-modified siloxane is present in an amount of at least 0.001% by volume based on the entire non-aqueous electrolytic solution.

7. The non-aqueous electrolytic solution of claim 4 wherein the electrolyte salt is a lithium salt.

8. A secondary battery comprising the non-aqueous electrolytic solution of claim 4.

9. An electrochemical capacitor comprising the non-aqueous electrolytic solution of claim 4.

10. A lithium ion secondary battery comprising the non-aqueous electrolytic solution of claim 4.

\* \* \* \* \*